United States Patent [19]

Chen et al.

[11] Patent Number: 5,063,260

[45] Date of Patent: Nov. 5, 1991

[54] COMPOSITIONS AND THEIR USE FOR TREATING FIBERS

[75] Inventors: Kun-Long Chen, Taipei; Yung-Yu Hsu, Tao Yuan, both of Taiwan

[73] Assignee: Dow Corning Corporation, Midland, Mich.

[21] Appl. No.: 694,156

[22] Filed: May 1, 1991

[51] Int. Cl.⁵ .................... C08L 83/04; C04B 31/00; C08K 5/01; D06M 15/66
[52] U.S. Cl. .................................... 523/213; 523/435; 524/188; 524/588; 524/860; 525/474; 525/476; 525/477; 528/33; 252/8.6; 252/8.8; 106/287.1; 106/287.11
[58] Field of Search ............... 523/213, 435; 525/474, 525/476, 477; 524/188, 588, 860; 252/8.6, 8.8; 106/287.1, 287.11; 528/33

[56] References Cited

U.S. PATENT DOCUMENTS

| | | | |
|---|---|---|---|
| 3,876,459 | 4/1975 | Burrill | 428/447 |
| 4,098,701 | 7/1978 | Burrill et al. | 524/861 |
| 4,177,176 | 12/1979 | Burrill et al. | 524/838 |
| 4,292,362 | 9/1981 | Marwitz et al. | 528/34 |
| 4,412,035 | 10/1983 | Kurita | 524/838 |
| 4,427,815 | 1/1984 | Ona et al. | 524/315 |
| 4,459,382 | 7/1984 | Ona et al. | 524/860 |
| 5,000,861 | 3/1991 | Yang | 252/8.6 |
| 5,017,297 | 5/1991 | Spyropoulos et al. | 252/8.8 |

*Primary Examiner*—Paul R. Michl
*Assistant Examiner*—Christopher P. Rogers
*Attorney, Agent, or Firm*—Robert L. McKellar

[57] ABSTRACT

This invention discloses curable silicon compositions which impart beneficial characteristics to the fibers that are not possible without the use of the instant invention compositions and process.

8 Claims, No Drawings

COMPOSITIONS AND THEIR USE FOR TREATING FIBERS

This invention deals with silicone compositions and their use to treat animal, cellulosic and synthetic fibers.

More specifically, this invention deals with curable silicone compositions which impart beneficial characteristics to the fibers that are not possible without the use of the instant invention compositions and process.

BACKGROUND OF THE INVENTION

It is generally known to treat textile fibers with organopolysiloxanes to impart a variety of valuable properties to the fibers, such as water repellency, lubricity, anti-pilling, good laundry and dry cleaning durability, and the like. The use of organopolysiloxanes to achieve such properties is now well established but there continues to be a need to improve these and other desirable properties of the fibers, especially the anti-pilling properties of the fabrics made from treated fibers. In particular, there has existed a desire to improve the properties of the fibers while improving the processes by which the organopolysiloxane compositions are applied to the fibers, and in this regard, the need to speed up the processing of the fibers is the most urgently needed.

Typical of prior art compositions and processes used for achieving the desirable processing and end use properties are those curable compositions disclosed in U.S. Pat. No. 3,876,459, issued Apr. 8, 1975 to Burrill in which there is set forth compositions obtained by mixing polydiorganosiloxanes having terminal silicon-bonded hydroxyl radicals with an organo-silane (or partial hydrolysates thereof) of the formula RSiR'n(X)3-n, in which R is a monovalent radical containing at least two amine groups, R' is an alkyl or aryl group, X is an alkoxy radical and n is 0 or 1.

The polydiorganoxiloxanes are linear or substanially linear siloxane polymers having terminal silicon-bonded hydroxyl radicals and an average degree of substitution on silicon of 1.9 to 2.0 wherein the substituents are generally methyl radicals. The siloxane polymers have an average molecular weight of at least 750 with the prefered molecular weight being in the range of 20,000 to 90,000. The cure mechanism appears to arise through the reaction of the hydrolyzable groups on the silane with the silanol groups of the siloxane polymer, usually under the influence of a catalyst, and at elevated temperatures.

There is a second Burrill disclose in U.S. Pat. No. 4,177,176, issued Dec. 4, 1979, in which an additional composition is disclosed for use in treating fibrous materials. The composition is disclosed as containing a polydiorganosiloxane having a molecular weight of at least 2500 and terminal -OX groups in which X is hydrogen, lower alkyl or alkoxyalkyl groups with the proviso that there also be present at least two substituents in the polydiorgano-siloxanes which are amine groups. There is also present an organosiloxane having at least three silicon-bonded hydrogen atoms, the curing mechanism being based on the reaction of the silicon-bonded hydrogen atoms with the silanol end bloks of the polydiorganosiloxane polymers under the influence of catalyst.

Also included in the prior art is the disclosure of Burrill,. et al. in U.S. Pat. No. 4,098,701, issued July 4, 1978 in which the inventors set forth yet another curable polysiloxane composition which has been found useful for treating fibers which comprises a polydiorganosiloxane in which at least two silicon-bonded substituents contain at least two amino groups, a siloxane having silicon-bonded hydrogen atoms, and a siloxane curing catalyst. A study of the '701 patent shows that "siloxane curing catalyst" is used in the sense that non-siloxane containing organofunctional compounds are used to cure siloxane curable materials, and that siloxane compositions that function as catalysts is not intended.

Finally there is disclosed in the prior art the curable system described by Spyropolous, et al, in European patent application publication 0 358 329 wherein microemulsions are described in which the oil phase comprises a reaction product of an organosilicon compound having amino groups and an organosilicon compound having epoxy groups, wherein the reaction product has at least one amino group and two silicon-bonded -OR groups, and a method for making the microemulsions. The organosilicon compound having at least one silicon-bonded substitutent of the general formula —R'NHR", wherein R' is a divalent haydrocarbon group having up to 8 carbon atoms, and R" denotes hydrogen, an alkyl group or a group of the general formula —R'NH2, and (B) an organosilicon compound having at least one substituent of the general formula —R'—Y, wherein R' is as defined for those above, and Y denotes an epoxy group containing moiety, whereby the molar ratio of amino groups in (A) to epoxy groups in (B) is greater than 1/1, there being present in the reaction product at least two silicon-bonded -OR groups, wherein R denotes an alkyl, aryl, alkoxyalkyl, alkoxyaryl or aryloxyalkyl groups having up to 8 carbon atoms.

THE INVENTION

The instant invention deals with compositions and improved processes for their use to treat fibers to enhance the properties of the fibers.

More specifically, this invention deals with new and novel compositions of matter comprising:

(A) 36 to 94.9 weight percent of an amino organofunctional substantially linear polydiorganosiloxane polymer having the general formula

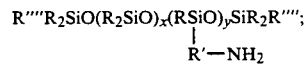

(B) 5 to 55 weight percent of a blend of (i) an epoxyorganofunctional substantially linear polydiorganosiloxane polymer having the general formula

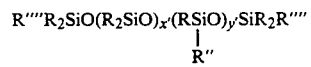

and (ii) a carboxylic acid organofunctional substantially linear polydiorganosiloxane polymer having the general formula

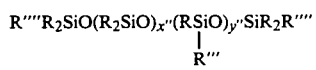

wherein each R"" is selected from alkyl radicals having 1 to 4 carbon atoms, alkoxy groups having 1 to 4 carbon atoms, or the hydroxyl radical and each R is selected from alkyl radicals having 1 to 4 carbon atoms and at least 50 percent of the total substituents in each of the linear aminoorganofunctional, epoxyorganofunctional and carboxylic acid organofunctional polydiorganosiloxanes being methyl radicals; each R' is selected from divalent organic radicals comprising alkylene, aralkylene and alkarylene radicals having 2 to 12 carbon atoms, —(Q)$_m$NH(Q')$_n$—, wherein Q and Q' are each selected from the groups of R', and m and n each have a value of at least 1; x has a value of 1 to 3000; y has a value of 1 to 60; R'' is selected from monovalent epoxyfunctional organic groups, wherein each R'' is bonded to a silicon atom through a divalent organic bridge; x' has a value of 1 to 3000; y' has a value of 1 to 75; R''' is selected from a monovalent carboxylic acid organic group wherein each R''' is bonded to a silicon atom through a divalent organic bridge; x'' has a value of 1 to 3000; y'' has a value of 1 to 60, wherein the weight ratio of (B)(i) to (B)(ii) is in the range of 95:5 to 5:95 and, (C) 0.1 to 10 weight percent of an aminoorganosilane having the general formula $$\underset{R_pSi(OR)_r}{\overset{(R'NH_2)_q}{|}}$$

wherein R has the same meaning as set forth for R above, R' has the same meaning as set forth for R' above, p has a value of 0 or 1 or 2, q has a value of at least 1, r has a value of at least one, and the total value of p, q, and r has to be four; all weight percentages being based on the total weight of components (A), (B), and (C).

In accordance with this invention then, there is provided a component (A) which is an aminoorganofunctional substantially linear polydiorganosiloxane polymer having the general formula $$\underset{R'-NH_2}{\overset{R''''R_2SiO(R_2SiO)_x(RSiO)_ySiR_2R''''}{|}}$$

This polymer, as well as the other diorganopolysiloxane polymers of this invention, (B)(i) and (B)(ii), are linear or substantially linear in structure, that is, they can have a small degree of branching, and for purposes of this invention, whenever the word "linear", or the phrase "substantially linear" is used herein, both mean linear and polymers having a small degree of branching. The component (A) polymer contains hydroxyl groups or trialkyl silyl groups bonded to each terminal end of the polymer chain. As indicated by the general formula, there is present in this polymer diorgano substituted siloxane units along with other siloxane units which will be described in detail infra. The subisitutents R can be selected from alkyl radicals having 1 to 4 carbon atoms and the preferred alkyl substitutent is the methyl radical. Each R'''' can be selected from hydroxyl groups, or they can be selected from alkyl radicals having from 1 to 4 carbon atoms. It is thus contemplated within the scope of this invention, that the polymers in components A and B can have a hydroxyl group on one end of the polymer chain and a trialkylsilyl group on the opposite end of the polymer, or both ends of the polymer chain can be capped with trialkylsilyl groups, or both ends of the polymers can have hydroxyl groups on them or both groups can be alkoxy end blocked. For purposes of this invention, polysiloxanes forming components (A) and (B) should have at least 50 percent of the total alkyl substituents as methyl radicals.

R' for purposes of this component is a divalent organic radical selected from alkylene, aralkylene and alkarylene radicals having from 2 to 12 carbon atoms. Thus, R' can be, for example —(CH$_2$)$_2$—, —(CH$_2$)$_3$—,

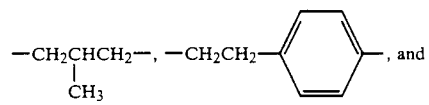

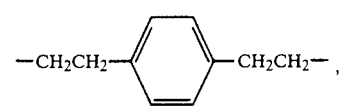

and the like. Preferred for this invention are the alkylene bridges, ethylene, propylene, and butylene, and most preferred is the divalent radical —(CH$_2$)$_3$—. Also included within the scope of the definition of R' is the divalent radical —(Q)$_m$NH(Q')$_n$—wherein Q and Q' are selected from the groups of R' and m and n each have a value of at least 1. Such materials can be for example —(CH$_2$)$_3$NH(CH$_2$)$_2$—,

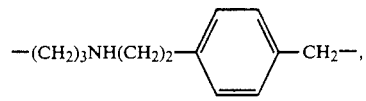

—(CH$_2$)$_4$NHCH$_2$CH$_2$—, —CH$_2$CH(CH$_3$)CH$_2$NHCH$_2$—, —(CH$_2$)$_3$NHCH$_2$CH$_2$NHCH$_2$CH$_2$—, $$\underset{CH_2CH_2-}{\overset{-(CH_2)_3NHCH_2CH_2CH(CH_2)_3-}{|}}$$

and the like. Preferred for the bridging group of this formula is the bridging group —(CH$_2$)$_3$NH(CH$_2$)$_2$—.

The value of x in component (A) ranges from 1 to 3000, with the preferred range being 400 to 1000 and the most preferred range being from 500 to 800. The value of y in this component is in the range of 1 to 60, with the preferred range being 1 to 20, the most preferred range being from 2 to 10.

The amount of component (A) that has been found useful in this invention is from 36 to 94.9 weight percent, such percent being based on the weight of all of the components (A), (B), and (C) in this invention. Preferred amounts range from 50 to 80 weight percent, and the most preferred amounts range from 60 to 80 weight percent.

Thus, the feature of this polymer is that it is an amino organofunctional polydialkylsiloxane which is reactive towards components (B) and (C) of this invention.

The polydiorganosiloxane (A) can be prepared by known techniques, for example, by the techniques set forth in European Patent Publication 0 358 329.

Component (B) of this invention comprises a blend of two organofunctionalsiloxanes designated in this invention as (B)(i) and (B)(ii).

Component (B)(i) for purposes of this invention is an epoxyorganofunctional substantially linear siloxane polymer having the general formula

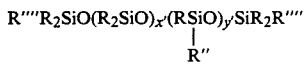

This polymer, as indicated above, is a linear or a substantially linear polymer. The definition of R for this polymer is the same as that set forth above for R of the component (A) polymer. For this invention, the value of x' is 1 to 3000 and a preferred range for this value is about 20 to 2000, with the most preferred range being on the order of about 300 to 700. The value of y' for this invention is in the range of 1 to 75, it being understood that the preferred range is from 2 to about 50, the most preferred range being from 2 to 15.

R" in this component is selected from monovalent epoxyfunctional organic groups wherein each R" is bonded to a silicon atom through a divalent organic bridge. The divalent organic bridges that are useful in this component are those that have been described above for R'. Thus, those materials useful as R" in this invention can be for example

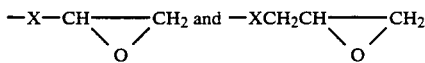

wherein X denotes a divalent hydrocarbon or halogenated hydrocarbon group, e.g. methylene, ethylene, propylene, phenylene and chloroethylene. Specific R" groups groups include, for example,

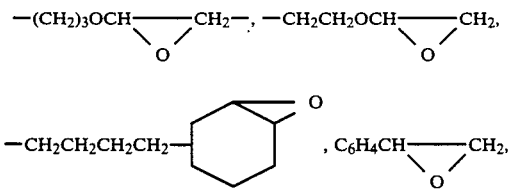

and the like. Preferred for this invention are the R" components

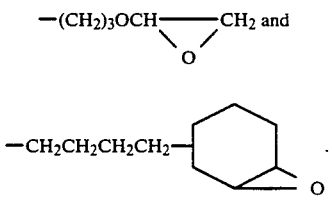

Thus, the feature of this polymer is that it is an epoxy organofunctional polydialkylsiloxane which is reactive towards components (A) and (C) of this invention.

Blended with component (B)(i) of this invention is a component (B)(ii). Component (B)(ii) is a carboxylic acid organofunctional linear polydiorganosiloxane polymer having the general formula

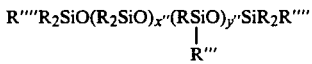

This polymer, as indicated above, is a linear or a substantially linear polymer. The definition of R for this polymer is the same as that set forth above for the component (A) polymer. For this invention, the value of x" is 1 to 3000 and a preferred range for this value is about 100 to 1000, with the most preferred range being on the order of about 200 to 600. The value of y" for this invention is in the range of 1 to 60, it being understood that the preferred range is from 2 to about 20, the most preferred range being from 2 to 10.

R'" in this component is selected from monovalent carboxylic acid functional organic groups wherein each R'" is bonded to a silicon atom through a divalent organic bridge. The divalent organic bridges that are useful in this component are those that have been described above for R'. Thus, those materials useful as R'" in this invention can be for example, —CH$_2$CH$_2$COOH, —CH$_2$CH$_2$CH$_2$COOH, —CH$_2$(CH$_2$CH$_2$COOH)$_2$ and —CH$_2$CH$_2$(CH$_2$COOH)$_2$. Most Preferred for this invention are the first two described R'" groups.

Thus, the feature of this polymer is that it is a carboxylic acid organofunctional polydialkylsiloxane which is reactive towards components (A) and (C) of this invention.

It should be understood that for purposes of this invention, component (B)(ii) can be an anhydride containing component, wherein the anhydride can be converted to the carboxylic acid derivative in the final formulation, or in the treating bath and it is contemplated by the inventors herein, that such anhydride functional materials fall within the scope of the instant invention.

Component (B), the blend of (B)(i) and (B)(ii), is used in an amount of 5 to 55 weight percent based on the total weight of components (A), (B), and (C). Preferred for this invention is an amount in the range of 12 to 40 weight percent, and most preferred is an amount in the range of 15 to 25 weight percent. Further, components (B)(i) and (B)(ii), for use in this invention can be blended in the ratio of 95:5 to 5:95. Preferred for this invention is a blend of 75:25 to 25:75 and most preferred is a blend of 60:40 to 40:60.

The polydiorganosiloxanes (B) can be prepared by known techniques for example by the methods and techniques disclosed in European Patent Publication 0 358 329, wherein the carboxylic acid functionality replaces the amino functionality or the epoxy functionality replaces the amino functionality.

Component (C) of this invention is an aminoorganosilane having the general formula

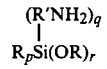

wherein R has the same meaning as set forth for R above, R' has the same meaning as set forth for R' above, p has a value of 0 or 1 or 2, q has a value of at least 1, r has a value of at least one, and the total value of p, q, and r has to be four. Component (C) can be used in this invention in the range of 0.1 to 10 weight percent based on the total weight of components (A), (B), and (C). Preferred for this invention is an amount in the range of 0.5 to 7 weight percent and most preferred for this invention is an amount in the range of 1 to 5 weight percent.

For purposes of this invention, such materials can be for example (RO)$_3$SiR'NH$_2$, (RO)$_2$Si(R)(R'NH$_2$), (RO)$_2$Si(R'NH$_2$)$_2$, and the like. Preferred for this invention are the aminoorganosilanes (RO)$_3$SiR'NH$_2$ and (RO)$_2$Si(R)(R'NH$_2$), and most preferred are those materials wherein R is methyl or ethyl and R' is ethylene, propylene, or butylene.

Aminoorganosilanes of this type are commercially available and can be prepared by the general method described in the above-mentioned European publication, and further disclosure of the methods of their preparation do not seem to be necessary herein.

Turning now to the process for treating fibers according the instant invention, it comprises a process for the treatment of animal, cellulosic and synthetic fibers comprising (I) applying a composition comprising (A) 36 to 94.9 weight percent of an aminoorganofunctional substantially linear polydiorganosiloxane polymer having the general formula

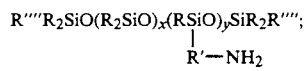

(B) 5 to 55 weight percent of a blend of
(i) an epoxyorganofunctional substantially linear polydiorganosiloxane polymer having the general formula

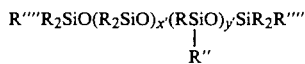

(ii) a carboxylic acid organo-functional substantially linear polydiorganosiloxane polymer having the general formula

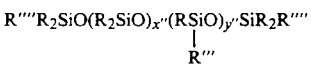

wherein each $R''''$ is selected from alkyl radicals having 1 to 4 carbon atoms and the hydroxyl group, R is selected from alkyl radicals having 1 to 4 carbon atoms and at least 50 percent of the total substituents in each of the linear aminoorganofunctional, epoxyorganofunctional and carboxylic acid organofunctional, polydiorganosiloxanes being methyl radicals; each R' is selected from divalent organic radicals comprising alkylene, aralkylene and alkarylene radicals having 2 to 12 carbon atoms, $-(Q)_m NH(Q')_n-$, wherein Q and Q' are each selected from the groups of R', and m and n each have a value of at least 1; x has a value of 1 to 3000; y has a value of 1 to 60; R'' is selected from monovalent epoxyfunctional organic groups, wherein each R'' is bonded to a silicon atom through a divalent organic bridge; x' has a value of 1 to 3000; y' has a value of 1 to 75; R''' is selected from a monovalent carboxylic acid organic group wherein each R''' is bonded to a silicon atom through a divalent organic bridge; x'' has a value of 1 to 3000; y'' has a value of 1 to 60, wherein the weight ratio of (B)(i) to (B)(ii) is in the range of 95:5 to 5:95 and, (C) 0.1 to 10 weight percent of an aminoorganosilane having the general formula

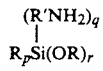

wherein R has the same meaning as set forth for R above, R' has the same meaning as set forth for R' above, p has a value of 0 or 1 or 2, q has a value of at least 1, r has a value of at least one, and the total value of p, q, and r has to be four; all weight percentages being based on the total weight of components (A), (B), and (C); (II) curing the composition on the fiber to obtain a treated fiber.

The compositions comprising components (A), (B), and (C) may be applied to the fibers by employing any suitable application technique, for example by padding or spraying, or from a bath. For purposes of this invention, the compositions can be applied from a solvent, but is preferred that the compositions be applied from an aqueous medium, for example, an aqueous emulsion. Thus, any organic solvent can be employed to prepare the solvent-based compositions, it being understood that those solvents that are easily volatilized at temperatures of from room temperature to less than 100° C. are preferred, for example, such solvents may include toluene, xylene, white spirits, chlorinated hydrocarbons, and the like. The treating solutions can be prepared by merely mixing the components together with the solvent. The concentration of the treating solution will depend on the desired level of application of siloxane to the fiber, and on the method of application employed, but it is believed by the inventors herein that the most effective amount of the composition should be in the range such that the fiber (or fabric) picks up the silicone composition at about 0.05 to 10% on the weight of the fiber or fabric. According to the instant inventive method of treatment, the fibers usually in the form of tow, or knitted or woven fabrics, are immersed in an aqueous emulsion of the compositions whereby the composition becomes selectively deposited on the fibers. The deposition of the composition on the fibers may also be expedited by increasing the temperature of the aqueous emulsion, temperatures in the range of from 20° to 60° C. being generally preferred.

Preparation of the aqueous emulsions can be carried out by any conventional technique. Most conveniently (A) and (B) are emulsified individually and the emuslsions thereafter combined, and thereafter, the silane (C) is added. The emulsifying agents are preferably of the non-ionic or cationic types and may be employed separately or in combinations of two or more. Examples of the preferred emulsifying agents are the reaction products of alcohols and phenols with ethylene oxide such as the polyethoxyethers of nonyl phenol and octyl phenol and the trimethylol ethers of polyethylene glycols, monoesters of alcohols and fatty acids such as glycerol monostearate and sorbitan monolaurate, and the ethoxylated amines such as those represented by the general formula

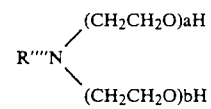

in which $R''''$ is an alkyl group having from about 12 to about 18 carbon atoms and the sum of a and b is from 2 to about 15. The emulsifying agents may be employed in proportions conventional for the emulsification of siloxanes, from about 1 to about 30% by weight based on the weight of the siloxane emulsified usually being appropriate.

The emulsions of the present invention may be macroemulsions or microemulsions and may also contain optional ingredients, for example antifreeze additives, biocides, organic softeners, antistatic agents, dyes and flame retardants.

Following the application of the siloxane composition the siloxane is then cured. Curing may be carried out by exposing the fibers to normal atmospheric temperatures for a period of from about 24 to 96 hours. Preferably, however, curing is expedited by exposing the treated fibers to elevated temperatures, preferably from 50° to 180° C.

The process of this invention can be employed for the treatment of animal fibers, such as wool, cellulosic fibers such as cotton, and synthetic fibers such as nylon, polyester and acrylic fibers, or blends of these materials, for example, polyester/cotton blends. The fibers may be treated in any form, for example as knitted and woven fabrics and as piece goods. They may also be treated as agglomerations of random fibers as in filling materials for pillows and the like such as fiberfil.

The composition of components (A), (B), and (C) should be used at about 0.05 to 2 weight percent in the final bath for exhaust method applications, and about 5 gm/l to 40 gm/l in a padding method of application, and about 5 gm/l to 200 gm/l for a spraying application. The compositions employed in this process are particularly suitable for application to the fibers or fabrics from an aqueous carrier. The compositions can be made highly substantive to the fibers, that is they can be made to deposit selectively on such fibers when applied thereto as aqueous emulsions. Such a property renders the compositions particularly suited for aqueous batch treatment by an exhaustion procedure, such exhaustion procedures being known to those skilled in the art. The compositions of the instant invention are new and novel and provide a fast cure and wide cure temperature ranges for curing them on fibers or fabrics compared to the compositions of the prior art, having a temperature cure range of from 120° C. to 180° C. Further, the fibers have superior slickness and no oily feeling after cure. The compositions of the instant invention provide consistant performance, good bath life of more than 24 hours at 40° C., have good laundry and dry cleaning durability, and have very good suitability for application by spraying.

EXAMPLES

The following example illustrates the invention.

TEST METHODS

Slickness is defined as a rating in which the reverse of friction is reported. Thus, a higher friction equals poor slickness. Coefficient of friction of a single fiber against other fibers is measured using a capstan method. A small metal pin is covered with fibers to be tested. The capstan is made to rotate about a horizontal axis while a fiber from the same sample, is draped over the surface at right angles to the axis of rotation. One end of the fiber is attached to a fixed cantilever force measuring system and the other end carries a small weight to hold the fiber against the pin and to remove its crimp. The coefficient of friction is measured at a range of relative speeds from 0.03 to 290 meters/minute. Under thse conditions $T_2/T_1 = \theta^u \theta$ where $T_1$ is the tension on the upward side of the fiber and $T_2$ is the net tension on the downward side, the angle is nearly always 180°. The coefficient of friction should be 0.05 or less.

EXAMPLE 1

An aminofunctional polymer having about 400 silicon atoms per molecule and about 2.25 mole % amino groups present as silicon-bonded —(CH$_2$)$_2$NH(CH$_2$)$_3$NH$_2$ groups and having a viscosity of about 7000 centistokes at room temperature was emulsified in water using nonylphenypolyether as a nonionic emulsifying agent to give an aqueous emulsion having about 35 weight percent solids.

A second emulsion was prepared using the nonionic surfactant wherein the emulsion contained approximately equal weights of an epoxyfunctional polymer having about 600 silicon atoms per molecule and about 1 mole % epoxy groups present as

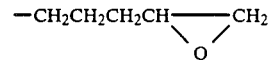

groups and having a viscosity of about 10,000 centistokes at room temperature and a carboxylic acid functional polymer having about 200 silicon atoms per molecule and about 2% carboxylic acid groups were used to give a 35 weight percent emulsion.

These two emulsion were blended together and then an aminofunctional silane was added and the blend was thoroughly mixed.

An aqueous emulsion was prepared to be used in the treatment of fibers by blending 69.62 grams of the 35% emulsion of aminofunctional polymer; 28.38 grams of the 35% emulsion of combined epoxy/carboxylic polymer, and 2.0 grams of a silane having the formula:

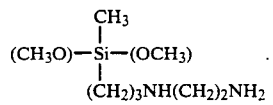

Prior to use as a treating bath, the total composition was diluted with cold water and homogenized to give a bath in which the silicone pick-up was on the order of 0.3% to 0.4% o.w.f. A polyester fiberfil tow was immersed in the bath, withdrawn, allowed to drain for a few minutes and then subjected to a hot oven cure at the temperatures found in Table I, using a hot air speed of movement through the oven of 1.5 meters/sec. This material was designated sample A.

A second formulation was used in which there was present 83.81 grams of the emulsion of aminofunctional polymer; 14.19 grams of the emulsion of the epoxy/carboxylic acid blend and 2.0 grams of the same silane as was used in sample A. This material was designated as sample B. In both cases, pre-drying was not used. The ease of curing can be found on Table I.

TABLE I

| CURING CONDITIONS | CURE TIME IN MINUTES | |
|---|---|---|
| TEMPERATURE/°C. | SAMPLE A | SAMPLE B |
| 120 | >20 | >20 |
| 130 | 10 | >10 |
| 140 | 8 | 10 |
| 150 | 5 | 8 |
| 160 | 3 | 4 |
| 170 | 3 | 3 |
| 180 | 3 | 3 |

EXAMPLE 2

Testing of the inventive compositions for slickness versus silicone pick-up.

Sample A was used in this test along with a material having 88.54 grams of the emulsion of aminofunctional polymer; 9.46 grams of the emulsion of the epoxy/carboxylic acid blend polymers, and 2.0 grams of the silane of the above examples. This latter composition was designated sample C. The results of the testing can be found on Table 2 below.

TABLE 2

| | SLICKNESS RATING | | | |
|---|---|---|---|---|
| SILI-CONE PICK-UP % o.w.f. | SAMPLE - A cure- 5 min. @ 160° C. | SAMPLE - C cure- 5 min. @ 160° C. | SAMPLE - A cure- 10 min. @ 160° C. | SAMPLE - C cure- 10 min. @ 160° C. |
| 0 | — | — | — | — |
| 0.15 | 48 | 48 | 65 | 54 |
| 0.23 | 55 | 57 | 70 | 64 |
| 0.27 | 65 | 66 | 75 | 68 |
| 0.45 | 73 | 72 | 80 | 72 |
| 0.70 | 90 | 89 | 95 | 95 |
| 1.00 | 88 | — | 88 | — |

That which is claimed is:

1. A composition of matter comprising
(A) 36 to 94.9 weight percent of an amino organofunctional substantially linear polydiorganosiloxane polymer having the general formula

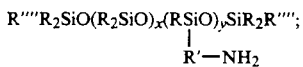

(B) 5 to 55 weight percent of a blend of (i) an epoxyorganofunctional substantially linear polydiorganosiloxane polymer having the general formula

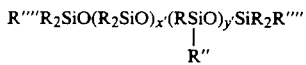

and (ii) a carboxylic acid organofunctional substantially linear polydiorganosiloxane polymer having the general formula

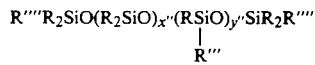

wherein each R'''' is selected from alkyl radicals having 1 to 4 carbon atoms, alkoxy radicals having 1 to 4 carbon atoms, or the hydroxyl radical and each R is selected from alkyl radicals having 1 to 4 carbon atoms and at least 50 percent of the total substituents in each of the linear aminoorganofunctional, epoxyorganofunctional and carboxylic acid organofunctional polydiorganosiloxanes being methyl radicals; each R' is selected from divalent organic radicals comprising alkylene, aralkylene and alkarylene radicals having 2 to 12 carbon atoms, —(Q)$_m$NH(Q')$_n$—, wherein Q and Q' are each selected from the groups of R', and m and n each have a value of at least 1; x has a value of 1 to 3000; y has a value of 1 to 60; R'' is selected from monovalent epoxyfunctional organic groups, wherein each R'' is bonded to a silicon atom through a divalent organic bridge; x' has a value of 1 to 3000; y' has a value of 1 to 75; R''' is selected from a monovalent carboxylic acid organic group wherein each R''' is bonded to a silicon atom through a divalent organic bridge; x'' has a value of 1 to 3000; y'' has a value of 1 to 60, wherein the weight ratio of (B)(i) to (B)(ii) is in the range of 95:5 to 5:95 and,
(C) 0.1 to 10 weight percent of an aminoorganosilane having the general formula

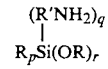

wherein R has the same meaning as set forth for R above, R' has the same meaning as set forth for R' above, p has a value of 0, 1 2, q has a value of at least 1, r has a value of at least one, and the total value of p, q, and r has to be four; all weight percentages being based on the total weight of components (A), (B), and (C).

2. A composition as claimed in claim 1 wherein there is present 50 to 80 weight percent of component (A), 2 to 40 weight percent of component (B) and 0.5 to 7 weight percent of component (C).

3. A composition as claimed in claim 1 wherein there is present 70 to 80 weight percent of component (A), 15 to 25 weight percent of component (B), and 1 to 5 weight percent of component (C).

4. The composition as claimed in claim 1 wherein x has a value of 400 to 1000 and y has a value of 1 to 20.

5. The composition as claimed in claim 1 wherein x' has a value of 20 to 2000 and y' has a value of 2 to 50.

6. The composition as claimed in claim 1 wherein x'' has a value of 100 to 1000 and y'' has a value of 2 to 20.

7. The composition as claimed in claim 1 in the form of an aqueous emulsion.

8. A process for the treatment of animal, cellulosic and synthetic fibers said process comprising contacting animal, cellulosic or synthetic fibers with a composition comprising
(A) 36 to 94.9 weight percent of an amino organofunctional substantially linear polydiorganosiloxane polymer having the general formula

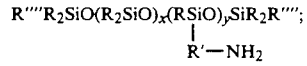

(B) 5 to 55 weight percent of a blend of (i) an epoxyorganofunctional substantially linear polydiorganosiloxane polymer having the general formula

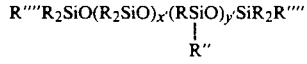

and (ii) a carboxylic acid organofunctional substantially linear polydiorganosiloxane polymer having the general formula

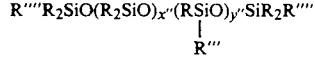

wherein each R'''' is selected from alkyl radicals having 1 to 4 carbon atoms, alkoxy radicals having 1 to 4 carbon atoms, or the hydroxyl radical and each R is selected from alkyl radicals having 1 to 4 carbon atoms and at least 50 percent of the total substituents in each of the linear aminoorganofunctional, epoxyorganofunctional and carboxylic acid organofunctional polydiorganosiloxanes being methyl radicals; each R' is selected from divalent organic radicals comprising alkylene, aralkylene and alkarylene radicals having 2 to 12 carbon atoms, $-(Q)_m NH(Q')_n-$, wherein Q and Q' are each selected from the groups of R', and m and n each have a value of at least 1; x has a value of 1 to 3000; y has a value of 1 to 60; R'' is selected from monovalent epoxyfunctional organic groups, wherein each R'' is bonded to a silicon atom through a divalent organic bridge; x' has a value of 1 to 3000; y' has a value of 1 to 75; R''' is selected from a monovalent carboxylic acid organic group wherein each R''' is bonded to a silicon atom through a divalent organic bridge; x'' has a value of 1 to 3000; y'' has a value of 1 to 60, wherein the weight ratio of (B)(i) to (B)(ii) is in the range of 95:5 to 5:95 and, (C) 0.1 to 10 weight percent of an aminoorganosilane having the general formula $$R_p Si(OR)_r \overset{(R'NH_2)_q}{|}$$

wherein R has the same meaning as set forth for R above, R' has the same meaning as set forth for R' above, p has a value of 0, 1 or 2, q has a value of at least 1, r has a value of at least one, and the total value of p, q, and r has to be four; all weight percentages being based on the total weight of components (A), (B), and (C);

(II) thereafter curing the composition on the fiber to obtain a treated fiber.

* * * * *